(12) United States Patent
Chai (10) Patent No.: US 11,718,374 B2
(45) Date of Patent: Aug. 8, 2023

(54) INFLATABLE BOAT PROCESSING METHOD, INFLATABLE BOAT AND PROCESSING DEVICES THEREOF

(71) Applicant: EVERMAX ECO INDUSTRY LTD., Zhejiang (CN)

(72) Inventor: Swo-Chung Chai, Jiashan (CN)

(73) Assignee: EVERMAX ECO INDUSTRY LTD., Jiashan (CN)

(*) Notice: Subject to any disclaimer, the term of this patent is extended or adjusted under 35 U.S.C. 154(b) by 300 days.

(21) Appl. No.: 17/012,023

(22) Filed: Sep. 3, 2020

(65) Prior Publication Data
US 2021/0070399 A1 Mar. 11, 2021

(30) Foreign Application Priority Data
Sep. 5, 2019 (CN) .......................... 201910837262.6

(51) Int. Cl.
| | |
|---|---|
| B63B 73/40 | (2020.01) |
| B29C 65/02 | (2006.01) |
| B29C 65/08 | (2006.01) |
| B29D 22/02 | (2006.01) |
| B63B 7/08 | (2020.01) |
| B63B 73/43 | (2020.01) |

(52) U.S. Cl.
CPC .............. *B63B 73/40* (2020.01); *B29C 65/02* (2013.01); *B29C 65/08* (2013.01); *B29D 22/02* (2013.01); *B63B 7/08* (2013.01); *B63B 73/43* (2020.01)

(58) Field of Classification Search
CPC ........... B63B 7/08; B63B 7/082; B63B 7/085; B63B 73/40; B63B 73/43; B29C 65/02; B29C 65/08
See application file for complete search history.

(56) References Cited

U.S. PATENT DOCUMENTS

| | | | | |
|---|---|---|---|---|
| 4,472,225 A | * | 9/1984 | Bimpson | .................... B63B 7/08 |
| | | | | 156/218 |
| 6,053,230 A | * | 4/2000 | Pelland | ................. B29C 66/729 |
| | | | | 156/367 |
| 6,471,803 B1 | * | 10/2002 | Pelland | ................. B29C 66/133 |
| | | | | 156/367 |

(Continued)

*Primary Examiner* — Ajay Vasudeva
(74) *Attorney, Agent, or Firm* — Daniel M. Cohn; Howard M. Cohn (57) ABSTRACT

An inflatable boat processing method, an inflatable boat and a processing device thereof, wherein the processing method comprising: cutting material into boat-side material pieces and a boat bottom material piece following an inflatable boat sample; connecting the adjacent edges of the boat-side material pieces in an overlapped mode, thereby obtaining a boat-side body; connecting the boat-side body with the boat bottom, wherein a first connecting end of the boat-side body is connected with the boat bottom material piece in an overlapped mode by means of pressing and ultrasonic bonding; sealing the boat-side body, wherein the edge of the first connecting end is connected with the edge of the second connecting end of the boat-side body in an overlapped mode; obtaining an inflatable boat. A heating-and-pressing device and an ultrasonic soldering device are adopted to perform hot-melting and pressing, thereby achieving the connection of two material pieces using ultrasonic bonding.

7 Claims, 6 Drawing Sheets

(56) References Cited

U.S. PATENT DOCUMENTS

| | | | |
|---|---|---|---|
| 7,467,496 B1 * | 12/2008 | Cuisset | E04H 15/20 |
| | | | 52/2.18 |
| 9,376,180 B2 * | 6/2016 | Swierkocki | B63B 7/082 |
| 9,527,249 B1 * | 12/2016 | Duggal | B32B 5/06 |

* cited by examiner

INFLATABLE BOAT PROCESSING METHOD, INFLATABLE BOAT AND PROCESSING DEVICES THEREOF

TECHNICAL FIELD

This disclosure generally relates to the technical field of inflatable boats, and more particularly, to an inflatable boat processing method, an inflatable boat, and processing devices thereof.

BACKGROUND

An inflatable boat is a boat that is filled with air during use but can be deflated for storage. The boat body, which is made of an airtight elastic material, comprises a floating chamber which forms a boat-side body. After the boat-side body and the boat bottom are connected and inflated, an inflatable boat having a certain shape is obtained.

The traditional method for processing an inflatable boat is to cut the airtight elastic material into multiple pieces and then bond them by glue. The shortcomings of the aforesaid method are: first, the bonding process inevitably uses a large amount of glue, and thus the volatilization of the solvent contained in the glue worsens the air in the workshop and damages the workers' health; second, as the inflatable boat is normally made through bonding multiple pieces of elastic material, to achieve the shaping of the inflatable boat, a plurality of arc-shaped edges are formed at the positions where the multiple pieces of elastic material are overlapped, which leads to an uneven coating of glue; third, glue bonding has demerits such as low bonding strength and easy aging; moreover, due to the uneven coating at the overlapped portions, air leakage may be easily caused by an external force; fourth, the bonding process comprises at least three steps: step 1, coating the glue; step 2, bonding the multiple pieces of elastic material; and step 3, making the glue solidify; surely, in steps 1 and 2, according to the type of the glue, there may be a step of making the solvent volatilize; the complicated bonding process results in a long production cycle and a low production efficiency.

In the prior art, the technical solution adopted for solving the air leakage problem caused by an external force due to the uneven coating at the overlapped portions is to increase the glue's use amount and coating area. However, because of the excessive use amount, the out-flowing of glue is unavoidable, and the workshop environment further deteriorates.

SUMMARY

The purpose of the present disclosure is to provide an inflatable boat processing method, an inflatable boat, and processing devices thereof.

To achieve the above purpose, the present disclosure adopts the following technical solution:

An inflatable boat processing method, comprising the steps of:

Step 1: cutting material following an inflatable boat sample: cutting the material into a plurality of boat-side material pieces and a boat bottom material piece;

Step 2: connecting the boat-side material pieces: connecting the adjacent edges of the boat-side material pieces in an overlapped mode along the shape of a boat-side body, wherein the to-be-connected portions of two boat-side material pieces are hot-melted first, and then the hot-melted portions are overlapped and tightly pressed, thereby obtaining a boat-side body, wherein a first connecting end and a second connecting end are formed on the inner side edge and the outer side edge of the boat-side body in its width direction;

Step 3: connecting the boat-side body with the boat bottom: connecting the first connecting end of the boat-side body with the boat bottom material piece in an overlapped mode, tightly pressing, and then bonding by ultrasonic bonding;

Step 4: sealing the boat-side body: connecting the edge of the first connecting end and the edge of the second connecting end of the boat-side body in an overlapped mode, wherein the contact surfaces of the first connecting end and the second connecting end are hot-melted first, and then the hot-melted surfaces of the first connecting end and the second connecting end are overlapped and tightly pressed, thereby obtaining the boat-side body having a closed annular air-storage chamber;

Step 5: obtaining an inflatable boat.

In another preferred embodiment, step 2 further comprises a step of connecting the boat-side triangular sheet with the outer surface of the boat-side body.

In another preferred embodiment, the inflatable boat processing method further comprises a step of transversely arranging reinforcing layers on the boat bottom material piece before the boat-side body and the boat bottom material piece are connected.

In another preferred embodiment, the inflatable boat processing method further comprises a step of connecting the inflation-and-deflation mouth with the boat-side body, wherein a mouth reinforcing layer is overlapped and tightly pressed on the outer edge of the inflation-and-deflation mouth, and then the overlapped portions are bonded by using ultrasonic wave, wherein the mouth reinforcing layer is overlapped and tightly pressed on the edge of the position where the inflation-and-deflation mouth is about to be mounted on the boat-side body, and then the overlapped portions are bonded by using ultrasonic wave.

In another preferred embodiment, the inflatable boat processing method further comprises a step of arranging a reinforcing layer on the outer surface of the overlapped portion of adjacent boat-side material pieces after step 2, preferably between steps 2 and 3, a step of arranging a reinforcing layer on the outer surface of the overlapped portion of the first connecting end and the boat bottom material piece after step 3, preferably between steps 3 and 4, and a step of arranging a reinforcing layer on the outer surface of the overlapped portion of the first connecting end and the second connecting end after step 4.

In another preferred embodiment, the inflatable boat processing method further comprises a step of hot-melting, overlapping and then tightly pressing the outer surface of the overlapped portion and the contact surface of the reinforcing layer, thereby enabling them to be firmly connected.

In another preferred embodiment, the inflatable boat processing method further comprises a step of arranging a reinforcing strip between the inner side of the boat-side body and the boat bottom after step 3 or step 4, wherein the two sides of the reinforcing strip are respectively overlapped with the outer surface of the inner side of the boat-side body and the upper surface of the boat bottom, wherein the reinforcing strip surrounds the inner side of the boat-side body and is located near the boat bottom.

An inflatable boat, comprising a boat-side body, a boat bottom, and an inflation-and-deflation mouth, wherein at least one reinforcing layer is transversely provided at the boat bottom, and the two ends of the reinforcing layer extend towards the boat-side body, wherein a reinforcing strip is arranged at a position where the inner side of the boat-side body and the upper surface of the boat bottom are connected, wherein the two sides of the reinforcing strip are respectively fixedly connected with the boat-side body and the boat bottom.

In another preferred embodiment, a boat-side triangular sheet is fixedly arranged on the boat-side body, and the boat-side triangular sheet is provided with a hanging hook for hooking a rope.

In another preferred embodiment, the boat-side body comprises a closed annular chamber for storing air.

In another preferred embodiment, the closed annular air-storage chamber is divided into at least two independent air-storage chambers, and each air-storage chamber is provided with an inflation-and-deflation mouth.

In another preferred embodiment, both the boat-side body and the boat bottom are hexagonal. The boat-side body is formed by sequentially connecting a first boat-side material piece, a second boat-side material piece, a third boat-side material piece, a fourth boat-side material piece, a fifth boat-side material piece, and a sixth boat-side material piece.

A heating-and-pressing device for performing hot-melting and pressing, comprising a first roller, a second roller, a pressing driving device, a power assembly, and a hot-air assembly, wherein the hot-air assembly further comprises an air nozzle and a hot-air generating device, wherein the pressing driving device propels the first roller and the second roller to switch between a pressing station and a release station, wherein the power assembly propels the first roller and/or the second roller to rotate, wherein an air inlet of the air nozzle is communicated with an air outlet of the hot-air generating device through a pipeline, and an air outlet of the air nozzle faces the pressing station.

In another preferred embodiment, the heating-and-pressing device further comprises a reinforcing belt delivering mechanism, which is capable of clamping the reinforcing belt wound in a disc manner while introducing the reinforcing belt into between the first roller and the second roller following the motion of the power assembly.

An ultrasonic soldering device for performing pressing and ultrasonic bonding, comprising an ultrasonic generator, a transducer, an upper mold, a lower mold, and an upper mold pressing driving mechanism, wherein the transducer is fixedly arranged on the upper mold, wherein the upper mold is fixedly arranged on an output end of the upper mold pressing driving mechanism and is switched between an operating station and a rest station above the lower mold along the movement of the output end of the upper mold pressing driving mechanism.

Compared with the prior art, the present disclosure has the following advantages:

The overlapped portions of the boat-side material pieces and the boat bottom material piece are hot-melted first, and then the hot-melted portions are tightly pressed, thereby enabling them to be integrally connected. The processing method of the present disclosure completely replaces the conventional glue bonding method, which is eco-friendly and achieves high connection strength.

The portions where the boat-side body and the boat bottom are connected are soldered by ultrasonic soldering, which makes the connection strength between the main force-bearing parts higher, thus ensuring the strength of the inflatable boat and enhancing the carrying ability.

Through the reinforcing layers and reinforcing strip arranged at the boat bottom and the connected portions of the boat-side body, the structure of the boat body becomes more stable. The closed annular air-storage chamber is divided into at least two independent air-storage chambers, and each air-storage chamber is provided with an inflation-and-deflation mouth. Through adopting the aforesaid design, even if gas leakage occurs in any air-storage chamber, the rest of the air-storage chambers ensure sufficient buoyancy such that the safety of the boat body is greatly improved.

In FIGS. 1-11: 1—Boat-side Body, 11—The First Boat-side Material Piece, 12—The Second Boat-side Material Piece, 13—The Third Boat-side Material Piece, 14—The Fourth Boat-side Material Piece, 15—The Fifth Boat-side Material Piece, 16—The Sixth Boat-side Material Piece, 17—The First Connecting End, 18—The Second Connecting End, 2—Boat Bottom, 21—The First Overlapped Edge, 22—The Second Overlapped edge, 23—The Third Overlapped Edge, 24—The Fourth Overlapped Edge, 25—The Fifth Overlapped Edge, 26—The Sixth Overlapped Edge, 3—Boat-side Triangular Sheet, 4—Inflation-and-deflation Mouth, 5—Reinforcing Layer, 7—Reinforcing Strip, 100—Heating-and-pressing Device, 111—The First Roller, 112—The Second Roller, 120—Power Assembly, 130—Pressing Driving Device, 131—Pressing Driving Device Output End, 140—Hot-air Assembly, 141—Air Nozzle, 142—Hot-air Generating Device, 150—Hot-air Assembly Translation Mechanism, 160—Reinforcing Belt Delivering Mechanism, 161—Delivering Tray, 162—Supporting Frame, 163—Guiding Roller, 164—Reinforcing Belt, 165—Tray Shaft, 200—Ultrasonic Soldering Device, 210—Upper Mold Pressing Driving Mechanism, 211—Upper Mold Pressing Driving Mechanism Output End, 220—Upper Mold, 221—Upper Holder, 222—Soldering Head, 230—Lower Mold, 231—Lower Mold Upper End Surface, 240—Transducer.

DETAILED DESCRIPTION

Figures and detailed embodiments are combined hereinafter to clearly and completely describe the purpose, technical solution, and advantages of the present disclosure.

Obviously, the described embodiments are merely a part but not all of the embodiments of the present disclosure. The specification of the present disclosure may allow those skilled in the art to obtain other embodiments without paying creative labor, and thus all of which shall fall into the scope of the present disclosure.

In the description of the present disclosure, it should be understood that the orientations or positions indicated by the terms "upper" and "lower" are based on the orientations or positions shown in the figures, or the orientations or positions that the product of the present disclosure is commonly placed during use, or the orientations or positions that are commonly understood by those skilled in the art. They are merely for the convenience of describing and simplifying the description of the present disclosure, but not indicating or implying that the equipment or element referred to must have a specific orientation, or be constructed and operated in a specific orientation. Thus, they cannot be understood as a limitation of the present disclosure.

In addition, the terms "first" and "second" are used for descriptive purposes only and cannot be understood as the indication or implication of relative importance or the implication of the number of indicated technical features.

Embodiment 1

Figure 1:
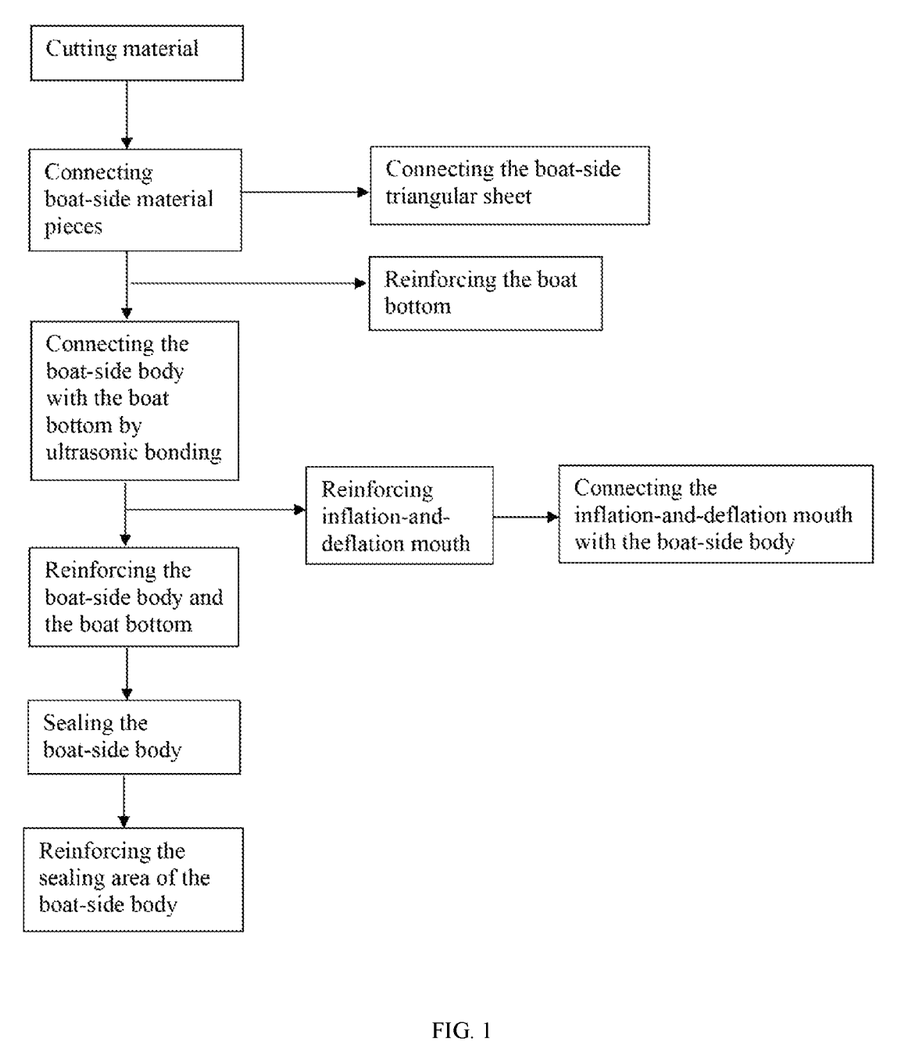
FIG. 1 is a flow diagram illustrating the inflatable boat processing method of the present disclosure.
Figure 2:
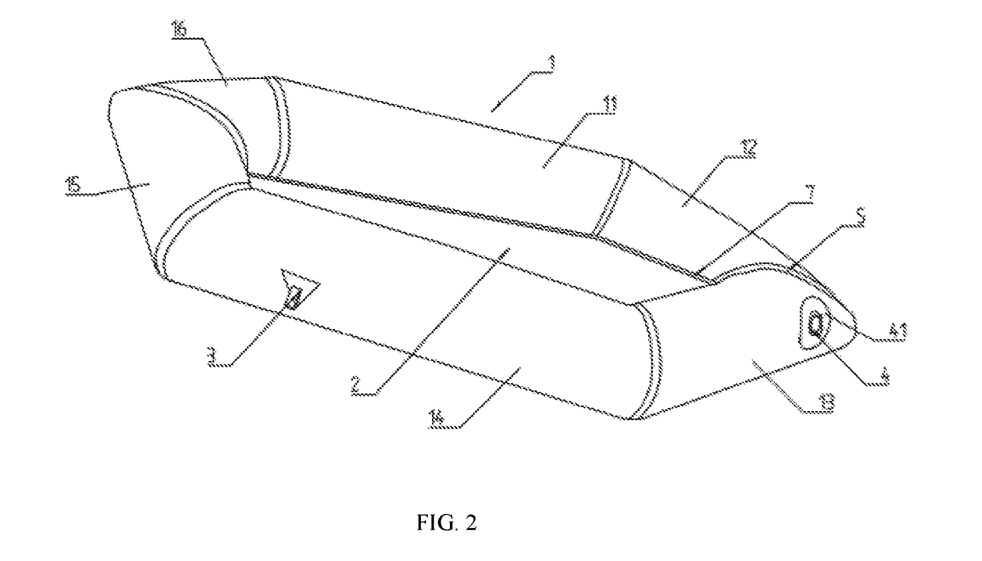
FIG. 2 is a conceptual diagram illustrating an example structure of the inflatable boat of the present disclosure.

In this embodiment, the inflatable boat processing method of the present disclosure is described by taking an inflatable boat having the following structure as an example. As shown in FIG. 2, the inflatable boat mainly comprises a boat-side body 1 having a closed annular chamber for storing air and a boat bottom 2. The boat-side body 1 further comprises a first boat-side material piece 11, a second boat-side material piece 12, a third boat-side material piece 13, a fourth boat-side material piece 14, a fifth boat-side material piece 15, and a sixth boat-side material piece 16. The boat bottom 2, which is formed by a whole piece of hexagonal boat bottom material, comprises a first overlapped edge 21, a second overlapped edge 22, a third overlapped edge 23, a fourth overlapped edge 24, a fifth overlapped edge 25, and a sixth overlapped edge 26. In addition, a boat-side triangular sheet 3 is fixedly arranged on the boat-side body 1, and the boat-side triangular sheet 3 is provided with a hanging hook for hooking a rope when the inflatable boat needs to be dragged or parked. Moreover, an inflation-and-deflation mouth 4 is arranged on the boat-side body 1, which allows the closed annular air-storage chamber to be inflated for use or deflated for storage. During the assembly, the adjacent edges of the first boat-side material piece 11, the second boat-side material piece 12, the third boat-side material piece 13, the fourth boat-side material piece 14, the fifth boat-side material piece 15, and the sixth boat-side material piece 16 are sequentially connected with each other and then connected with the boat bottom material piece. In this way, the body of an inflatable boat is formed. Surely, to improve the strength of the boat-side body and each overlapped portion, the outer surface of each overlapped portion is reinforced by a reinforcing layer 5.

Figure 3:
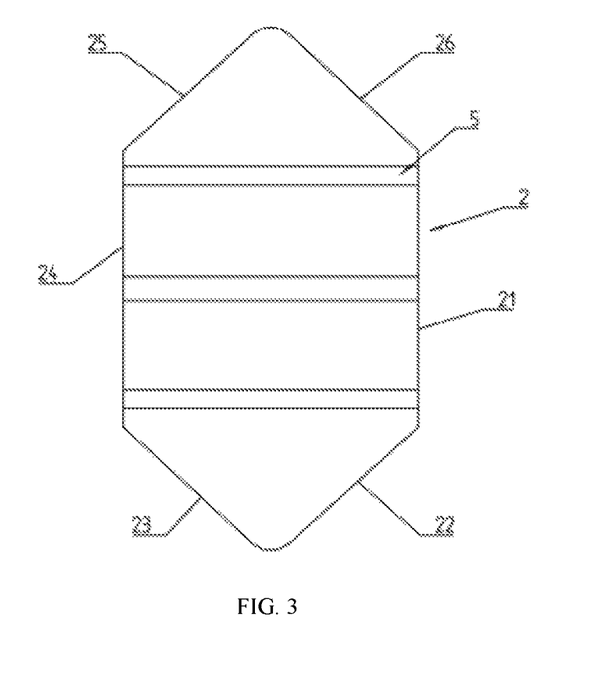
FIG. 3 is a conceptual diagram illustrating an example structure of the boat bottom material piece of the present disclosure.

An inflatable boat processing method of the present disclosure, comprising the steps of:

Step 1: cutting material following an inflatable boat sample, wherein the material is cut following the sample into a plurality of boat-side material pieces and a boat bottom material piece, namely, the first boat-side material piece 11, the second boat-side material piece 12, the third boat-side material piece 13, the fourth boat-side material piece 14, the fifth boat-side material piece 15, the sixth boat-side material piece 16 and the boat bottom material piece 2; in this embodiment, preferably, the material is a yielding elastic material with hot-melt layers on both sides, such as rubber, PVC, PU and TPU.

Figure 4:
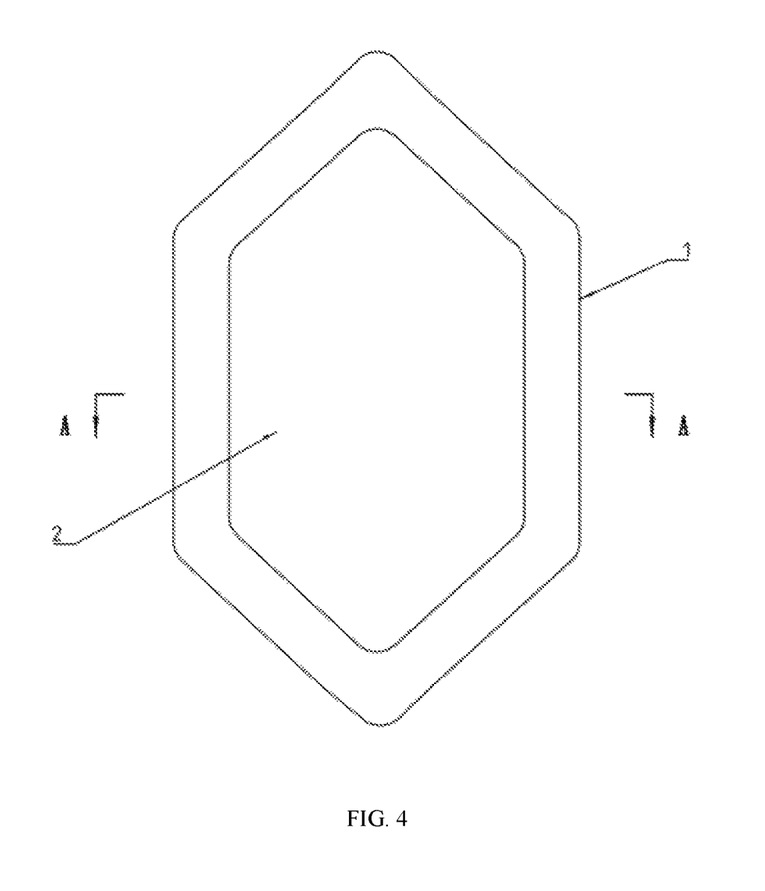
FIG. 4 is a conceptual diagram illustrating an example structure of the boat-side body of the present disclosure.

Step 2: sequentially connecting the adjacent edges of the first boat-side material piece 11, the second boat-side material piece 12, the third boat-side material piece 13, the fourth boat-side material piece 14, the fifth boat-side material piece 15 and the sixth boat-side material piece 16 in an overlapped mode along the shape of the boat-side body 1, wherein the to-be-connected portions of two boat-side material pieces are hot-melted first, and then the hot-melted portions are overlapped and tightly pressed, so that the adjacent edges are connected; for instance, after the hot-melt layers on the to-be-connected portions of the first boat-side material piece 11 and the second boat-side material piece 12 are melted, the portions are quickly overlapped and tightly pressed, thus ensuring that the overlapped portions of the first boat-side material piece 11 and the second boat-side material piece 12 are firmly integrated; it should be noted that, in this embodiment, the overlapping and pressing are preferably performed from one end of the contact surfaces of the first boat-side material piece 11 and the second boat-side material piece 12, wherein the contact surfaces are pressed while being heated; namely, the contact surfaces are pressed from one end to the other until they are completely overlapped and bonded; definitely, the contact surfaces of the first boat-side material piece 11 and the second boat-side material piece 12 may also be integrally hot-melted, overlapped and pressed, thereby completing the connection of the adjacent edges.

Figure 5:
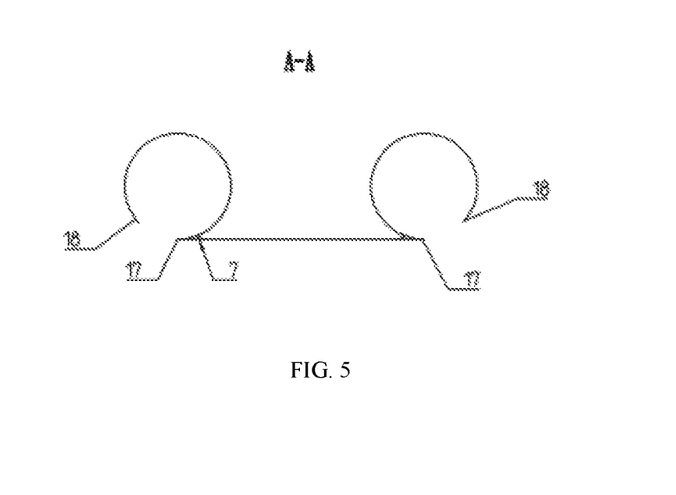
FIG. 5 is a conceptual diagram illustrating a sectional view taken along line A-A in FIG. 4.

According to the aforesaid, the adjacent edges of the first boat-side material piece 11, the second boat-side material piece 12, the third boat-side material piece 13, the fourth boat-side material piece 14, the fifth boat-side material piece 15 and the sixth boat-side material piece 16 are connected in an overlapped mode such that a boat-side body is formed; at this point, the boat-side body is not connected with the boat bottom material piece, and a first connecting end 17 and a second connecting end 18 are formed on the inner side edge and the outer side edge of the boat-side body in its width direction.

Figure 9:
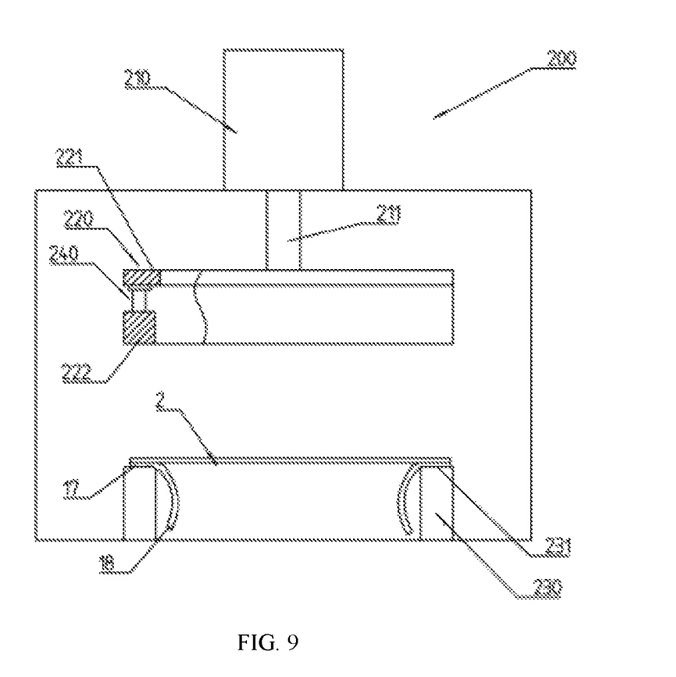
FIG. 9 is a conceptual diagram illustrating an example structure of the ultrasonic soldering device of the present disclosure.

Step 3: connecting the first connecting end 17 of the boat-side body and the boat bottom material piece 2 in an overlapped mode, pressing tightly, and then bonding the overlapped portions by ultrasonic bonding; as shown in FIG. 9, in this embodiment, preferably, the boat-side body is sleeved in a lower mold 230, the first connecting end 17 is placed on the upper end surface of the lower mold 230, and then the boat bottom material piece 2 is paved on the first connecting end 17 of the boat-side body; subsequently, the edge of the boat bottom material piece 2 and the first connecting end 17 are overlapped; after the width of the overlapped portions is adjusted, by means of the ultrasonic bonding, as well as the mutual pressing of the upper mold and the lower mold, the first connecting end 17 of the boat-side body is connected with the boat bottom material piece.

Step 4: connecting the edge of the first connecting end 17 and the edge of the second connecting end 18 of the boat-side body in an overlapped mode, wherein the contact edge surfaces of the first connecting end 17 and the second connecting end 18 are hot-melted first, and then the hot-melted surfaces of the first connecting end 17 and the second connecting end 18 are overlapped and tightly pressed, thereby obtaining the boat-side body 1 having a closed annular air-storage chamber.

Step 5: obtaining an inflatable boat.

Preferably, step 2 further comprises a step of connecting the boat-side triangular sheet 3 with the outer surface of the boat-side body. In this embodiment, it is desirable that at least a surface of the boat-side triangular sheet 3 in contact with the boat-side body is provided with a hot-melt layer, wherein the contact surfaces of the boat-side triangular sheet 3 and the boat-side body are hot-melted first, and then the contact surfaces are overlapped and tightly pressed, thereby completing the assembly of the boat-side triangular sheet 3.

Further, as the bottom of the inflatable boat is a portion carrying loads, the strength of the boat bottom is crucial. To reinforce the boat bottom, in this embodiment, a reinforcing layer 5 is transversely arranged on the boat bottom material piece before the boat-side body and the boat bottom material piece are connected, wherein the reinforcing layer and the corresponding contact surface of the boat bottom material piece are hot-melted first, and then the reinforcing layer is tightly pressed on the contact surface of the boat bottom material piece, thereby completing the reinforcement. Preferably, there are three reinforcing layers, which are respectively located near the head portion, the tail portion, and the middle portion of the boat bottom material piece.

Further, the inflatable boat processing method further comprises a step of connecting the inflation-and-deflation mouth 4 with the boat-side body. More specifically, the outer edge of the inflation-and-deflation mouth 4 is connected with a mouth reinforcing layer 41 in an overlapped mode. The mouth reinforcing layer 41 is tightly pressed on the outer edge of the inflation-and-deflation mouth 4, and then the overlapped portions are bonded by using ultrasonic wave. Subsequently, the mouth reinforcing layer 41 is overlapped and pressed on the edge of the position where the inflation-and-deflation mouth 4 is about to be mounted on the boat-side body, and then the overlapped portions are bonded by using ultrasonic wave. Thus, the inflation-and-deflation mouth 4 is connected with the boat-side body 1.

In this embodiment, considering the structural reinforcement of the inflatable boat and the reliability of the overlapped portions, preferably, the inflatable boat processing method of the present disclosure further comprises a step of arranging a reinforcing layer on the outer surface of the overlapped portion of adjacent boat-side material pieces between steps 2 and 3, a step of arranging a reinforcing layer on the outer surface of the overlapped portion of the first connecting end and the boat bottom material piece 2 between steps 3 and 4, and a step of arranging a reinforcing layer on the outer surface of the overlapped portion of the first connecting end 17 and the second connecting end 18 after step 4. Preferably, the outer surface of the overlapped portion and the contact surface of the reinforcing layer are hot-melted and then pressed tightly such that the aforesaid two are firmly integrated.

The bottom of the inflatable boat carries loads of cargo and passengers. The buoyancy generated by the boat-side body is used for balancing the loads borne by the bottom of the inflated boat. In other words, the strength and reliability of the inflatable boat are guaranteed only when the bonding force between the boat-side body and the boat bottom is strong enough. In this embodiment, the positions where the boat-side body is connected with the boat bottom are processed by ultrasonic bonding. Through adopting the ultrasonic bonding, the melting degree and depth of the hot-melt layers are much higher, which makes the connection between the boat-side body and the boat bottom more stable. The strength of ultrasonic bonding is much higher than that of glue bonding. Additionally, other overlapped portions are hot-melted and tightly pressed, the strength of which is slightly lower than that of ultrasonic bonding but much greater than that of glue bonding. Moreover, the arrangement of the reinforcing layers further improves the strength of the overlapped portions and the inflatable boat.

Embodiment 2

Figure 11:
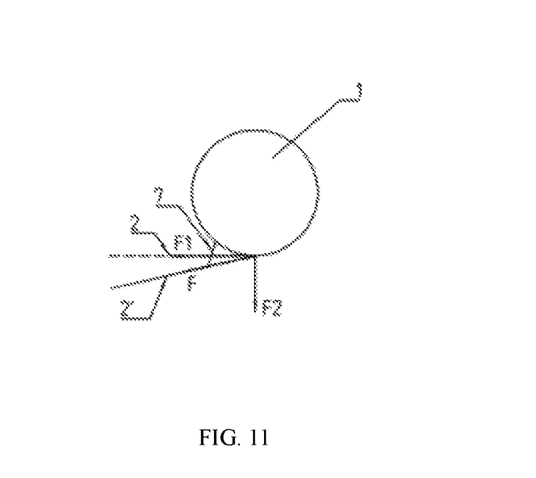
FIG. 11 is a conceptual diagram illustrating an analysis of forces borne by the boat body of the present disclosure.

As the bottom of the inflatable boat is made of an elastic material, the boat bottom deforms when it bears loads. Under such circumstances, an acting force which may tear the portions where the boat bottom and the boat-side body are connected apart may be easily produced (as shown in FIG. 11, the acting force F2 is a vertical component force produced at the boat bottom after loading). If the component force F2 is large enough, the portions where the boat bottom and the boat-side body are connected may be torn apart, resulting the damage of the inflatable boat.

The difference between embodiment 2 and embodiment 1 is: the inflatable boat processing method of embodiment 2 further comprises a step of arranging a reinforcing strip between the inner side of the boat-side body and the boat bottom after step 3 or step 4. The two sides of the reinforcing strip are respectively overlapped with the outer surface of the inner side of the boat-side body and the upper surface of the boat bottom. The reinforcing strip 7 surrounds the inner side of the boat-side body and is located near the boat bottom. More specifically, the contact surfaces of the reinforcing strip 7 and the boat-side body are heated simultaneously, and after the hot-melt layers on the contact surfaces of the reinforcing strip 7 and the boat-side body are melted, the contact surfaces are quickly overlapped, and sufficient pressure is imposed thereon, thereby enabling one side of the reinforcing strip 7 to be connected with the boat-side body. Subsequently, the contact surfaces of the reinforcing strip 7 and the boat bottom are heated simultaneously, and after the hot-melt layers on the contact surfaces of the reinforcing strip 7 and the boat bottom are melted, the contact surfaces are quickly overlapped, and sufficient pressure is imposed thereon, thereby enabling the other side of the reinforcing strip 7 to be connected with the boat bottom. In this embodiment, through arranging a reinforcing strip 7 between the boat bottom and the inner side of the boat-side body, the component force F2 is significantly weakened such that the inflatable boat is protected against the damage.

Embodiment 3

An inflatable boat of the present disclosure comprises a boat-side body 1, a boat bottom 2, and an inflation-and-deflation mouth 4, wherein at least one reinforcing layer is transversely provided at the boat bottom, and the two ends of the reinforcing layer 5 extend towards the boat-side body. A reinforcing strip 7 is arranged at a position where the inner side of the boat-side body 1 and the upper surface of the boat bottom are connected. The two sides of the reinforcing strip 7 are respectively fixedly connected with the boat-side body 1 and the boat bottom 2. By means of the reinforcing layer and the reinforcing strip arranged at the boat bottom and the position where the boat bottom and the boat-side body are connected, a stable structure of the boat body is achieved. A boat-side triangular sheet 3 is fixedly arranged on the boat-side body 1, and the boat-side triangular sheet 3 is provided with a hanging hook for hooking a rope. The boat-side body 1 comprises a closed annular chamber for storing air. Preferably, the closed annular air-storage chamber is divided into at least two independent air-storage chambers, and each air-storage chamber is provided with an inflation-and-deflation mouth. Through adopting the aforesaid design, even if gas leakage occurs in any air-storage chamber, the rest of the air-storage chambers ensure sufficient buoyancy of the boat body such that the safety of the boat body is greatly improved. Both the boat-side body and the boat bottom are hexagonal. The boat-side body is formed by sequentially connecting a first boat-side material piece, a second boat-side material piece, a third boat-side material piece, a fourth boat-side material piece, a fifth boat-side material piece, and a sixth boat-side material piece.

Embodiment 4

To achieve the hot-melting and pressing of the overlapped portions in the inflatable boat processing method of embodiment 1 and embodiment 2, a heating-and-pressing device for performing the hot-melting and pressing in the inflatable boat processing method is adopted in the present disclosure.

Figure 6:
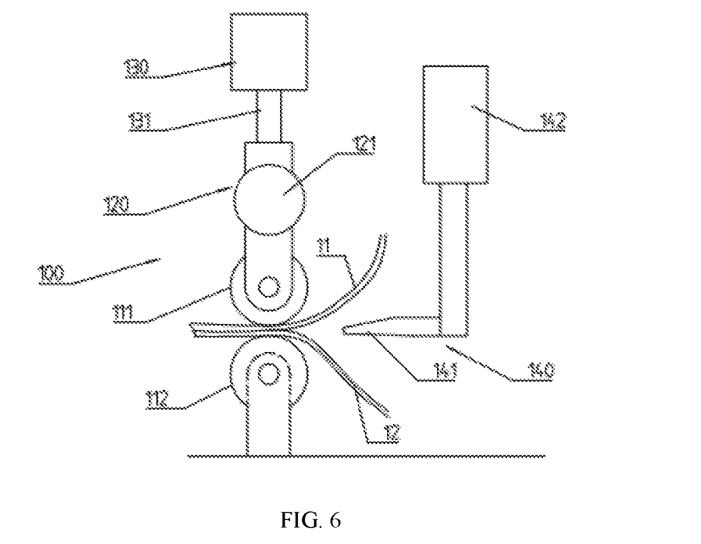
FIG. 6 is a conceptual diagram illustrating a front view of the heating-and-pressing device of the present disclosure.
Figure 7:
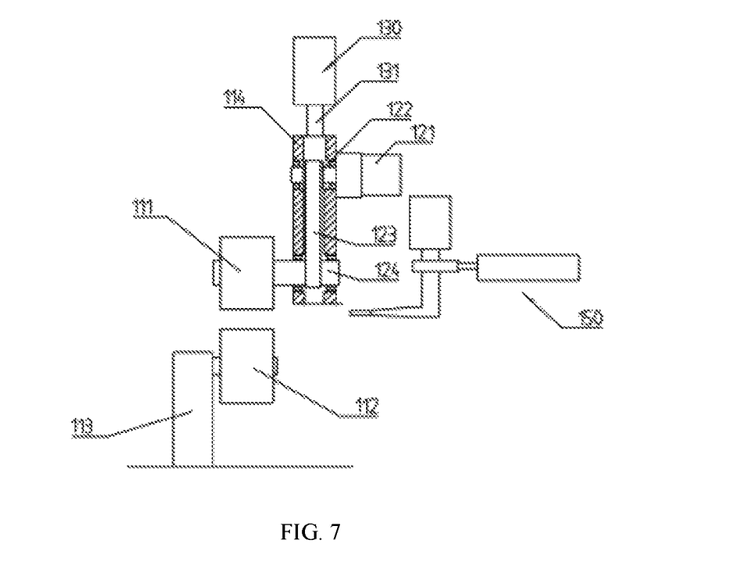
FIG. 7 is a conceptual diagram illustrating a left view of the heating-and-pressing device of the present disclosure.

As shown in FIGS. 6-7, the heating-and-pressing device 100 comprises a first roller 111, a second roller 112, a pressing driving device 130, a power assembly 120, and a hot-air assembly 140. The hot-air assembly further comprises an air nozzle 141 and a hot-air generating device 142. The pressing driving device 130 propels the first roller 111 and the second roller 112 to switch between a pressing station and a release station. The power assembly 120 propels the first roller 111 and/or the second roller 112 to rotate. An air inlet of the air nozzle 141 is communicated with an air outlet of the hot-air generating device 142 through a pipeline, and an air outlet of the air nozzle 141 faces the pressing station, thereby allowing the hot air to be directly closely blown to the workpiece to be heated. In this embodiment, preferably, the temperature of the air output from air nozzle is 350-400° C.

More specifically, in this embodiment, the first roller 111 and the second roller 112 are rubber rollers or nylon rollers, and the pressing driving device 130 is preferably a cylinder. The first roller 111 is movably mounted on an upper support 114, the second roller 112 is movably mounted on a lower support 113, and the upper support 114 is fixedly arranged on an output shaft 131 of the pressing driving device 130. The power assembly 120 comprises a driving motor 121 with a reduction gearbox, a driving belt wheel 122, a synchronous belt 123, and a driven belt wheel 124. The driving belt wheel 122 is fixedly arranged on an output shaft of the driving motor 121, and the driven belt wheel 124 is fixedly arranged on a transmission shaft fixedly connected with the first roller 111. In this way, after being decelerated by the reduction gearbox, the rotation of the driving motor 121 is transmitted to the first roller 111 through the driving belt wheel 122, the synchronous belt 123, and the driven belt wheel 124, thereby achieving the rotation of the first roller 111.

Further, preferably, the hot-air assembly 140 further comprises a hot-air assembly translation mechanism 150, and the air nozzle 141 is fixedly arranged at an output end of the hot-air assembly translation mechanism 150. Through the translation of the output end of the hot-air assembly translation mechanism 150, the air nozzle 141 may be switched between a working station and an avoiding station. When the air nozzle stays at the working station, the hot-air generating device 142 starts sucking air, and the air sucked into the hot-air generating device 142 is heated and then blown out from the outlet of the air nozzle 141 through the pipeline. The hot air blown to the surface of the workpiece to be heated makes the material on the surface of the workpiece melt. When the air nozzle stays at the avoiding station, the air nozzle is located to the side of the first roller and the second roller, and the hot-air assembly does not work, thus leaving a larger working area for allowing the workpiece to be smoothly processed.

The operating principle of the heating-and-pressing device is described by taking the connection process of the first boat-side material piece 11, and the second boat-side material piece 12 as an example. The to-be-connected first boat-side material piece 11 and second boat-side material piece 12 are placed on the surface of the second roller 112. After the width of the overlapped portions of the first boat-side material piece 11 and the second boat-side material piece 12 is adjusted, the output end 131 of the pressing driving device 130 propels the upper support 114 to move down, thereby enabling the first roller 111 and the second roller 112 to tightly press the overlapped portions of the first boat-side material piece 11 and the second boat-side material piece 12. The overlapped portions of first boat-side material piece 11 and second boat-side material piece 12 near the air nozzle 141 are respectively opened in the upper and lower directions to form a horn-shaped opening. At this point, the air nozzle 141 aims at the bottom of the horn-shaped opening. While the air nozzle 141 blows hot air, the power assembly propels the first roller 111 to rotate, thus propelling the first boat-side material piece 11 and the second boat-side material piece 12 to continuously enter between the first roller and the second roller. In this way, the portions of first boat-side material piece 11 and the second boat-side material piece 12 entering between the first roller and the second roller are pressed and integrated while the hot-melt layers on the contact surfaces of the first boat-side material piece 11 and the second boat-side material piece 12 are melted by the hot air. The air nozzle aiming at the bottom of the horn-shaped opening enables the first boat-side material piece 11 and the second boat-side material piece 12 to be evenly heated, and allows more heat to be concentrated near the overlapped portions. Thus, the hot-melt layers of the first boat-side material piece 11 and the second boat-side material piece 12 are sufficiently heated and melted such that high connection strength is achieved.

It should be noted that, the width of the air nozzle should match the width of the overlapped portions of the first boat-side material piece 11 and the second boat-side material piece 12, at least not less than the width of the first roller and the second roller, so that a sufficient heating area is ensured. The hot-air generating device is internally provided with an electric heating apparatus and a fan assembly, and the pipeline communicating with the air nozzle is made of a heat-resistant material. Moreover, to protect an operator from being scalded while reducing the heat loss of the pipeline, an insulating material, such as glass wool, is wrapped outside the pipeline and the air nozzle.

Embodiment 5

Figure 8:
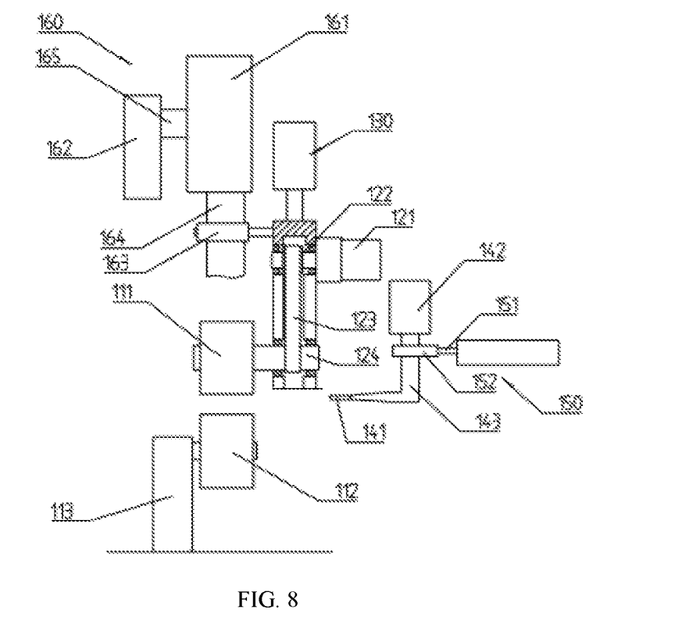
FIG. 8 is a conceptual diagram illustrating an example structure of the heating-and-pressing device in another embodiment of the present disclosure.

When a reinforcing belt is required for reinforcement (for ease of description, the reinforcing layer and the reinforcing strip are collectively called a reinforcing belt), the reinforcing belt needs to be delivered synchronously. The reinforcing belt and the overlapped portion may be connected by using a method same as connecting the first boat-side material piece 11 and the second boat-side material piece 12. To facilitate the synchronous delivery of the reinforcing belt, comparing with embodiment 3, the processing device of the present disclosure further comprises a reinforcing belt delivering mechanism 160, which is capable of clamping the reinforcing belt wound in a disc manner while introducing the reinforcing belt 164 into between the first roller 111 and the second roller 112 following the motion of the power assembly 120.

As shown in FIG. 8, the reinforcing belt delivering mechanism 160 comprises a delivering tray 161, a supporting frame 162, a pair of guiding rollers 163, and a tray shaft 165. The tray shaft 165 is fixedly arranged on the supporting frame 162, and the delivering tray 161 is movably mounted on the tray shaft 165. The reinforcing belt 164 is delivered from the delivering tray 161 and then passes through between the two guiding rollers. To enable the overlapped portion to be precisely reinforced by the reinforcing belt, in this embodiment, the delivering tray 161 is preferably located right above the first roller 111, and the edge of the delivering tray is flush with the first roller.

Its operating principle is the following: after the reinforcing belt 164 is introduced into between the first roller and the second roller, and the overlapped portion of the material pieces is adjusted to the middle position between the first roller and the second roller, the relative positions of the reinforcing belt 164 and the overlapped portion are adjusted, thus allowing the reinforcing belt 164 to be located right above the overlapped portion. Subsequently, by means of the heating of the hot air blown out from the air nozzle and the mutual pressing of the first roller and the second roller, the reinforcing belt and the overlapped portion are firmly integrated. As the aforesaid principle is the same as that for connecting the first boat-side material piece 11 and the second boat-side material piece 12 in embodiment 3, it is briefly described herein.

Embodiment 6

The first connecting end 17 of the boat-side body and the boat bottom material piece 2 are connected using ultrasonic bonding. However, both the boat-side body and the boat bottom material piece have a certain shape, which makes the bonding process of ordinary ultrasonic equipment complicated. In addition, due to the large bonding area of the first connecting end 17 of the boat-side body and the boat bottom material piece 2, conventional ultrasonic equipment requires a multi-point and multi-time bonding process, resulting in low bonding efficiency and poor sealing performance.

Based on the aforesaid, an ultrasonic soldering device is adopted for performing the ultrasonic bonding in the inflatable boat processing method.

Figure 10:
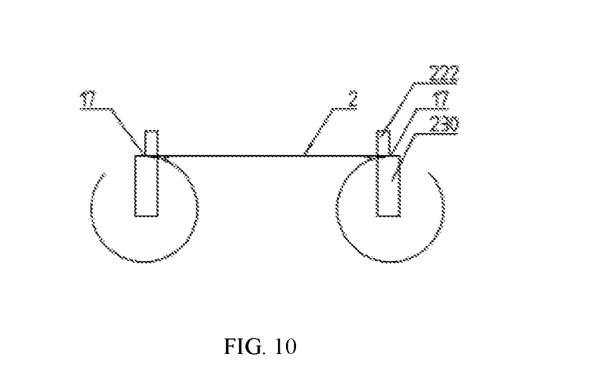
FIG. 10 is a conceptual diagram illustrating an ultrasonic soldering state of the present disclosure.

As shown in FIGS. 9-10, the ultrasonic soldering device 200 comprises an ultrasonic generator (not shown), a transducer 240, an upper mold 220, a lower mold 230, and an upper mold pressing driving mechanism 210. The transducer 240 is fixedly arranged on the upper mold 220. The upper mold 220 is fixedly arranged on an output end 211 of the upper mold pressing driving mechanism 210 and is switched between an operating station and a rest station above the lower mold 230 along the movement of the output end 211 of the upper mold pressing driving mechanism 210.

More specifically, the upper mold 220 comprises an upper holder 221 and a soldering head 222, wherein a fixed end of the transducer 240 is fixedly arranged on the upper holder 221, and a working end of the transducer 240 is fixedly arranged on the upper end surface 231 of the soldering head 222. In this way, when the upper mold pressing driving mechanism 210 propels the upper mold to move down to the operating station, the overlapped portions to be soldered are tightly pressed. At this point, the ultrasonic generator drives the transducer to operate such that the energy is transferred to the soldering head 222, which further transfers the received vibrational energy to the overlapped portions of the workpiece to be soldered. In this area, the vibrational energy is converted into heat energy by means of friction, which makes the overlapped portions of the workpiece to be soldered melt. In the meantime, the upper mold pressing driving mechanism 210 propels the soldering head to press down, thus tightly pressing the overlapped portions. In this way, the ultrasonic bonding effect is significantly improved. The pressure enables the overlapped portions of the workpiece to be firmly integrated. After the melting area of the overlapped portion is cooled to a preset temperature, the upper mold pressing driving mechanism 210 propels the upper mold to move up to the rest station, thereby completing the soldering process.

Specifically, its operating principle is: the lower mold 230 is designed according to the shape of the boat-side body, and the boat-side body is sleeved in the lower mold, which enables the first connecting end 17 of the boat-side body to be sufficiently unfolded such that creases are avoided. The first connecting end 17 is adjusted to be located on the upper end surface 231 of the lower mold, the boat bottom material piece 2 is placed above the first connecting end 17, and the upper mold pressing driving mechanism 210 propels the upper mold 220 to move down to the operating station. At this point, the first connecting end 17 and the boat bottom material piece are pressed between the soldering head 222 and the upper end surface 231 of the lower mold 230. Then, the ultrasonic generator drives the transducer to operate, thereby transferring the energy to the solder head 222. The vibrational energy received by the soldering head is further transferred to the overlapped portions of the first connecting end 17 and the boat bottom surface material. In this area, the vibrational energy is converted into heat energy by means of friction such that the overlapped portions of the first connecting end 17 and the boat bottom material piece are bonded tightly.

It should be noted that, the ultrasonic generator adopted in this embodiment is also called an ultrasonic driving power supply, an electronic box, or an ultrasonic controller, which is an important component of a high-power ultrasonic system. The ultrasonic generator is used for converting the city power into high-frequency AC signals matched with an ultrasonic transducer and for driving the ultrasonic transducer to operate, which belongs to the existing technology. The transducer in this embodiment is a device used for the interconversion between electric energy and acoustic energy, which also belongs to the existing technology. Additionally, the number of transducers arranged along the soldering head may be determined by specific design, and the output power of the transducer and the ultrasonic generator may be selected according to actual needs. It should be noted that the ultrasonic generator can be replaced with a high-frequency generator of the existing technology to form a high-frequency soldering device for soldering/bonding.

It should be noted that, in all embodiments, the portions bonded by using ultrasonic waves may also be bonded by using high-frequency waves.

The above are merely preferred embodiments of the present disclosure, and the scope of the present disclosure is not limited to the embodiments described above. All equivalent changes made according to the structure, shape, and principle of the present disclosure shall fall into the scope of the present disclosure.

What is claimed is:

1. An inflatable boat processing method, comprising:

cutting material following an inflatable boat sample, wherein cutting material following the inflatable boat sample comprises cutting the material into a plurality of boat-side material pieces and a boat bottom material piece;

connecting the boat-side material pieces, wherein connecting the boat-side material pieces comprises connecting adjacent edges of the boat-side material pieces in an overlapped mode along a shape of a boat-side body, wherein the to-be-connected portions of two of the boat-side material pieces are hot-melted first, and then the hot-melted portions are overlapped and tightly pressed, thereby obtaining a boat-side body, wherein a first connecting end and a second connecting end are formed on an inner side edge and an outer side edge of the boat-side body in its width direction;

connecting the boat-side body with the boat bottom material piece, wherein connecting the boat-side body with the boat bottom material piece comprises connecting the first connecting end of the boat-side body with the boat bottom material piece in an overlapped mode, tightly pressing, and then bonding by ultrasonic bonding;

sealing the boat-side body, wherein sealing the boat-side body comprises connecting the inner side edge of the first connecting end and the outer side edge of the second connecting end of the boat-side body in an overlapped mode, wherein the contact surfaces of the first connecting end and the second connecting end are hot-melted first, and then the hot-melted contact surfaces of the first connecting end and the second connecting end are overlapped and tightly pressed, thereby obtaining the boat-side body having a closed annular air-storage chamber; and obtaining an inflatable boat.

2. The inflatable boat processing method of claim 1, wherein connecting the boat-side material pieces further comprises:

connecting a boat-side triangular sheet with an outer surface of the boat-side body.

3. The inflatable boat processing method of claim 1, wherein further comprises:

transversely arranging at least one reinforcing layer on the boat bottom material piece before the boat-side body and the boat bottom material piece are connected.

4. The inflatable boat processing method of claim 1, further comprises:

connecting an inflation-and-deflation mouth with the boat-side body, wherein a mouth reinforcing layer is overlapped and tightly pressed on an outer edge of the inflation-and-deflation mouth, and then the overlapped portions of the mouth reinforcing layer and the outer edge are bonded by using ultrasonic wave, wherein the mouth reinforcing layer is overlapped and tightly pressed on the edge of the position where the inflation-and-deflation mouth is about to be mounted on the boat-side body, and then the overlapped portions are bonded by using ultrasonic wave.

5. The inflatable boat processing method of claim 1, further comprises:

arranging a first reinforcing layer on an outer surface of the overlapped portion of adjacent boat-side material pieces after connecting the boat-side material pieces;

arranging a second reinforcing layer on the outer surface of the overlapped portion of the first connecting end and the boat bottom material piece after connecting the boat-side body with the boat bottom material piece; and arranging a third reinforcing layer on the outer surface of the overlapped portion of the first connecting end and the second connecting end after sealing the boat-side body.

6. The inflatable boat processing method of claim 5, further comprises:

hot-melting, overlapping and tightly pressing the outer surface of the overlapped portion and the contact surface of the reinforcing layer, thereby enabling the overlapped portion and the contact surface of the reinforcing layer to be firmly connected.

7. The inflatable boat processing method of claim 1, further comprises:

arranging a reinforcing strip between the inner side of the boat-side body and the boat bottom material piece, wherein the two sides of the reinforcing strip are respectively overlapped with the outer surface of the inner side of the boat-side body and the upper surface of the boat bottom material piece, wherein the reinforcing strip surrounds the inner side edge of the boat-side body and is located near the boat bottom.

* * * * *